UNITED STATES PATENT OFFICE.

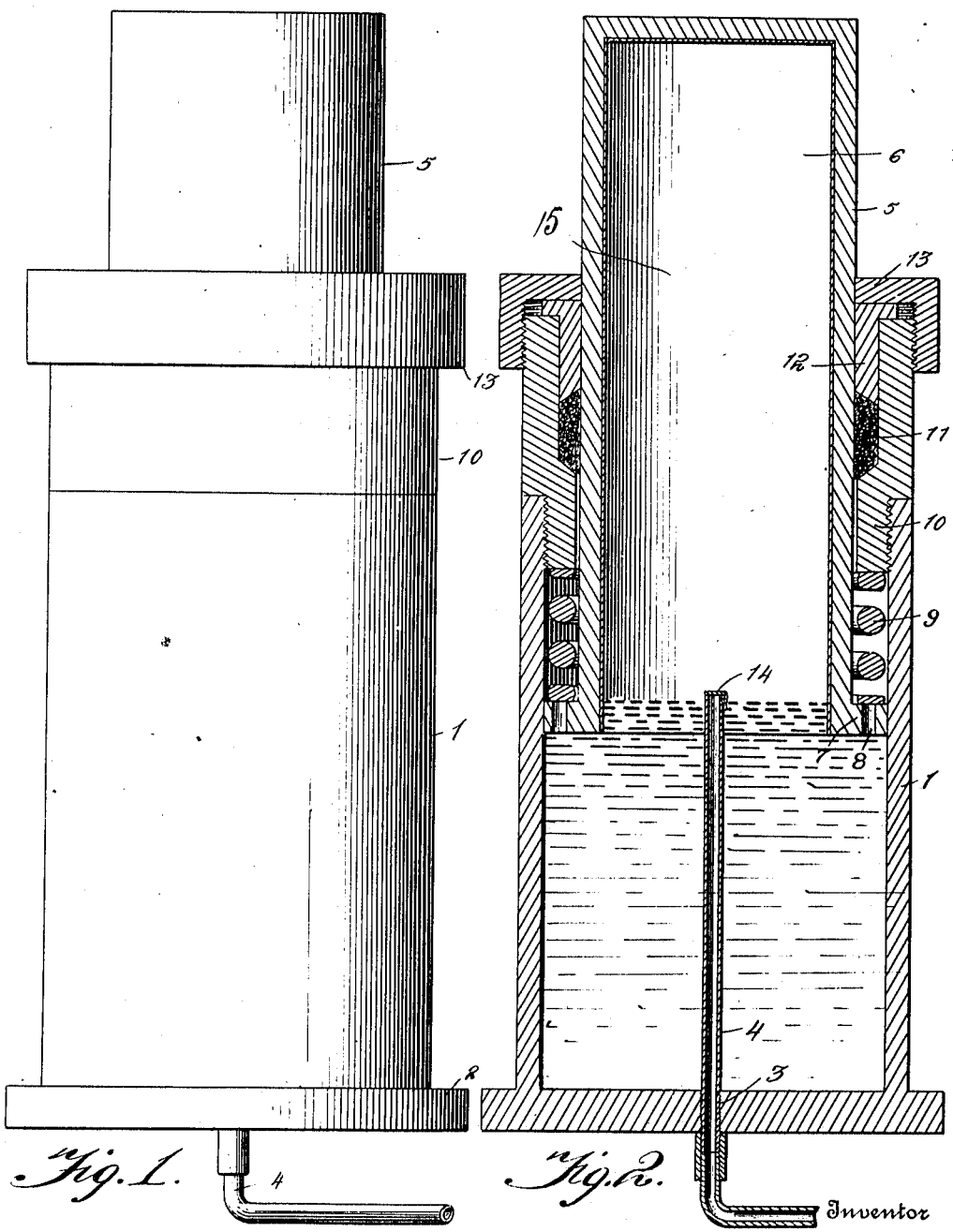

FULTON A. GREEN, OF KITTANNING, PENNSYLVANIA.

SHOCK-ABSORBER.

1,055,164.   Specification of Letters Patent.   Patented Mar. 4, 1913.

Application filed September 13, 1911. Serial No. 649,005.

*To all whom it may concern:*

Be it known that I, FULTON A. GREEN, a citizen of the United States of America, residing at Kittanning, in the county of Armstrong and State of Pennsylvania, have invented new and useful Improvements in Shock-Absorbers, of which the following is a specification.

This invention relates to improvements in shock absorbers or buffing devices intended for use in connection with motor driven vehicles and the like so as to prevent the transmission of shocks from the running gear to the body of the vehicle and to permit easy movement of the vehicle body relative to the running gear.

The invention has for one of its objects the provision of a device of this character which shall be simple in construction, cheap for manufacture, and efficient and positive in operation.

A further object of the present invention is to provide a device of this character which shall include a cylinder containing a body of non-expansible liquid, and a piston mounted in the said cylinder for sliding movement and partly immersed in said liquid, the said piston being in open communication with the liquid and containing a body of compressible fluid adapted to coöperate with the non-expansible liquid in the combination of the shock, whereby to eliminate shocks and to permit the easy running of the vehicle.

A still further object of the invention is the provision of a shock absorber or buffing device which may be used in conjunction with the usual springs of a vehicle to coöperate with the latter to take up the vibration of the vehicle body relative to the running gear in the event of the vehicle meeting obstructions in the road bed in its course of travel.

With the above and other objects in view the invention consists in the construction, combination, and arrangement of parts hereinafter fully set forth in and falling within the scope of the appended claim.

In the drawings:—Figure 1 is a side elevation of a device constructed in accordance with the present invention, and Fig. 2 is a vertical sectional view thereof.

Referring more particularly to the accompanying drawings wherein is illustrated the preferred form of the invention, and in which like numerals of reference designate similar parts throughout the views, the numeral 1 designates a cylinder having a circumferentially enlarged base 2 provided with a centrally arranged opening 3 threaded to receive a fluid conveying pipe 4. The pipe 4 projects into the cylinder 1 a suitable distance above the base 2 for a purpose to be hereinafter fully described.

Mounted within the cylinder 1 and slidable therein, is a piston 5, which latter is hollow to provide an air chamber 6. At its lower end the piston 5 is in open communication with the cylinder 1 and is provided with an enlarged circumferential flange 7 having passages 8 formed therein. The flange 7 is designed to contact with the interior of the cylinder 1 and on its upper surface receives one end of a helical expansion spring 9 which encircles the piston 5 interiorly of the cylinder 1. The opposite end of the spring 9 is engaged by a stuffing box 10 which latter is threaded into the upper end of the cylinder 1 intermediate the same and the piston 5. The stuffing box 10 is provided with suitable packing 11 secured in position by the gland 12, the upper end of the stuffing box being screw threaded to receive the cap 13. As before stated the pipe 4 is inserted a suitable distance into the cylinder 1 for the purpose of conveying oil and air into the said cylinder and the chamber 6 of the piston 5 respectively. The oil being allowed to flow into the cylinder until the level of the same is above the outlet of the pipe 4 and the bottom of the piston 5 whereby the air contained in the chamber 6 will be imprisoned therein between the head of the cylinder and the oil. The upper or discharge end of the pipe 4 is provided with a safety valve 14, which latter is oil tight to prevent the back flow of oil through the pipe 4 in the operation of the device, but is adjustable to permit the escape of air from the chamber 6 upon the same reaching a predetermined point of compression.

The operation of my invention is as follows: Upon an obstruction being met in the travel of the vehicle, the piston 5 will be forced downwardly in the cylinder 1 and the air in the chamber 6 of the said piston will be compressed thereby forcing the oil through the passages 8 in the flange 7 of the piston, the movement of the oil uncovering the valve 14 to the air confined within the chamber 6 of the piston and the packing 11 preventing the oil from flowing out of the cylinder. When the air in the chamber 6 reaches a certain point of compression, determined by the adjustment of the valve 14, the said valve will open and permit the escape of a sufficient quantity of air to facilitate the operation of the device. After the parts have operated as described, the air compressed within the chamber 6 of the piston returns the same to its normal position, the rebound being taken up by the spring 9. The chamber 6 of the piston 5 is preferably lined with gum or other suitable material, as indicated at 15, so that the air will be confined within the chamber 6 in the event of the metal being porous.

In the foregoing description taken in connection with the accompanying drawings, the advantages of the construction and the mode of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claim.

Having thus described the invention, what I claim is:

A shock absorber comprising a cylinder containing a body of non-expansible liquid, a hollow piston slidably mounted in the cylinder and partly immersed in said liquid and containing a body of compressible fluid in contact with the liquid and adapted to be compressed in the downward movement of the piston to coöperate with the liquid and serving to return the piston to its normal position after the removal of compression, a stuffing box closing the end of said cylinder, an annular flange formed on the end of the piston within the cylinder and contacting with the walls of the latter, and a spring interposed between said flange and the adjacent end of the stuffing box whereby the return of the piston to normal will be cushioned.

In testimony whereof I affix my signature in presence of two witnesses.

FULTON A. GREEN.

Witnesses:
  SAMUEL J. COWAN,
  JAMES A. PAINTER.